United States Patent [19]

Caron

[11] Patent Number: 5,048,916

[45] Date of Patent: Sep. 17, 1991

[54] FIBER OPTIC CONNECTION SYSTEM

[75] Inventor: Bernard G. Caron, Harrisburg, Pa.

[73] Assignee: AMP Incorporated, Harrisburg, Pa.

[21] Appl. No.: 415,123

[22] Filed: Sep. 7, 1982

[51] Int. Cl.⁵ .......................... G02B 6/36; G02B 7/26
[52] U.S. Cl. .................................. 385/71; 350/96.21
[58] Field of Search ......................... 350/96.20, 96.21

[56] References Cited

U.S. PATENT DOCUMENTS

| | | | |
|---|---|---|---|
| 4,140,365 | 2/1979 | Burger et al. | |
| 4,183,616 | 1/1980 | Benoit et al. | 350/96.20 |
| 4,205,898 | 6/1980 | Matthews et al. | 350/96.21 |
| 4,208,095 | 6/1980 | Malsot | 350/96.21 |
| 4,261,644 | 4/1981 | Giannaris | 350/96.21 |
| 4,266,853 | 5/1981 | Hutchins et al. | 350/96.20 |
| 4,274,708 | 6/1981 | Cocito et al. | |
| 4,279,467 | 7/1981 | Borsuk et al. | 350/96.21 |
| 4,319,951 | 3/1982 | Korbelak et al. | 350/96.21 |
| 4,327,964 | 5/1982 | Haesly et al. | 350/96.20 |
| 4,332,435 | 6/1982 | Post | 350/96.20 |
| 4,359,262 | 11/1982 | Dolan | 350/96.20 |
| 4,373,776 | 2/1983 | Purdy | 350/96.20 |
| 4,428,645 | 1/1984 | Korbelak et al. | 350/96.20 |
| 4,432,602 | 2/1984 | Margolin | |
| 4,460,820 | 7/1984 | Matsumoto et al. | |
| 4,648,688 | 3/1987 | Ashman et al. | 350/96.20 |

FOREIGN PATENT DOCUMENTS

| | | |
|---|---|---|
| 2811766 | 9/1979 | Fed. Rep. of Germany . |
| 53-28440 | 3/1978 | Japan . |
| 55-62414 | 1/1980 | Japan . |
| 2058392 | 8/1981 | United Kingdom . |
| 1599688 | 10/1981 | United Kingdom . |

Primary Examiner—William L. Sikes
Assistant Examiner—Robert E. Wise
Attorney, Agent, or Firm—Adrian J. LaRue; Gerald K. Kita; Anton P. Ness

[57] ABSTRACT

An organizer is mounted on bars which are connected to end caps sealingly secured into stripped ends of fiber cables. Strength members of the cables are secured to the organizer and fiber optic connectors terminated onto ends of the fiber optic transmission members are connected together in profiled bores of coupling members which are releasably mounted in clips that are latchably mounted on the organizer. A split sleeve is sealingly secured onto the end caps.

24 Claims, 6 Drawing Sheets

FIBER OPTIC CONNECTION SYSTEM

FIELD OF THE INVENTION

This invention relates to connection systems and more particularly to connection systems for fiber optic transmission members.

BACKGROUND OF THE INVENTION

Fiber optic connection systems are known for connecting fiber optic transmission members. A typical system has ends of fiber optic transmission members connected together by fusion equipment and the fused ends are encased in an epoxy material. The encased fused ends are disposed in a rack that is mounted on an organizer; this assembly is then secured in a moisture proof enclosure. The fused fiber optic connections are not disconnectable, thus they cannot be tested nor adjusted to provide low light loss connections. The equipment to make the fusion splices is expensive and cannot be used in manholes because of explosion problems. Fusion splices of fiber optic transmission members cannot withstand wide temperature variations and they cannot be terminated except at the locations where the splices are to be made.

SUMMARY OF THE INVENTION

According to the present invention, an organizer is mounted on bars which are connected to end caps sealingly secured onto stripped ends of fiber optic cables. Strength members of the cables are secured to the organizer and fiber optic connectors terminated onto ends of the fiber optic transmission members are connected together in profiled bores of coupling members which are releasably mounted in clips that are latchably mounted on the organizer. A split sleeve is sealingly secured onto the end caps to encase the complete unit.

According to another aspect of the present invention, a fiber optic connector comprises a tubular member having a profiled bore in which complementary profiled ends of ferrule members having resilient characteristics which are secured onto ends of fiber optic transmission members are disposed. This assembly is positioned in the forked ends of a spring clip with the forked ends engaging projections of the ferrule members thereby applying axial forces to the ferrule members causing the profiled ends to intimately mate with complementary sections of the profiled bore whereby the resilient characteristics of the ferrule member ends align the ends of the fiber optic transmission members concentrically relative to the profiled bore.

DETAILED DESCRIPTION OF A PREFERRED EMBODIMENT

FIGS. 1 through 8 illustrate a fiber optic connection system 10 for connecting fiber optic transmission members 12 of each of fiber optic cables 14, a center wire strength member 16 around which is disposed fiber optic transmission members 12. Woven plastic strength members 18 surround the bundle of fiber optic transmission members 12 and a plastic sheath 20 surrounds the layer of strength members 18. A metallic layer 22 covers sheath 20 and can be either in braid or foil form. A plastic jacket 24 surrounds metallic layer 22 thereby completing the construction of the fiber optic cable.

Figure 1:
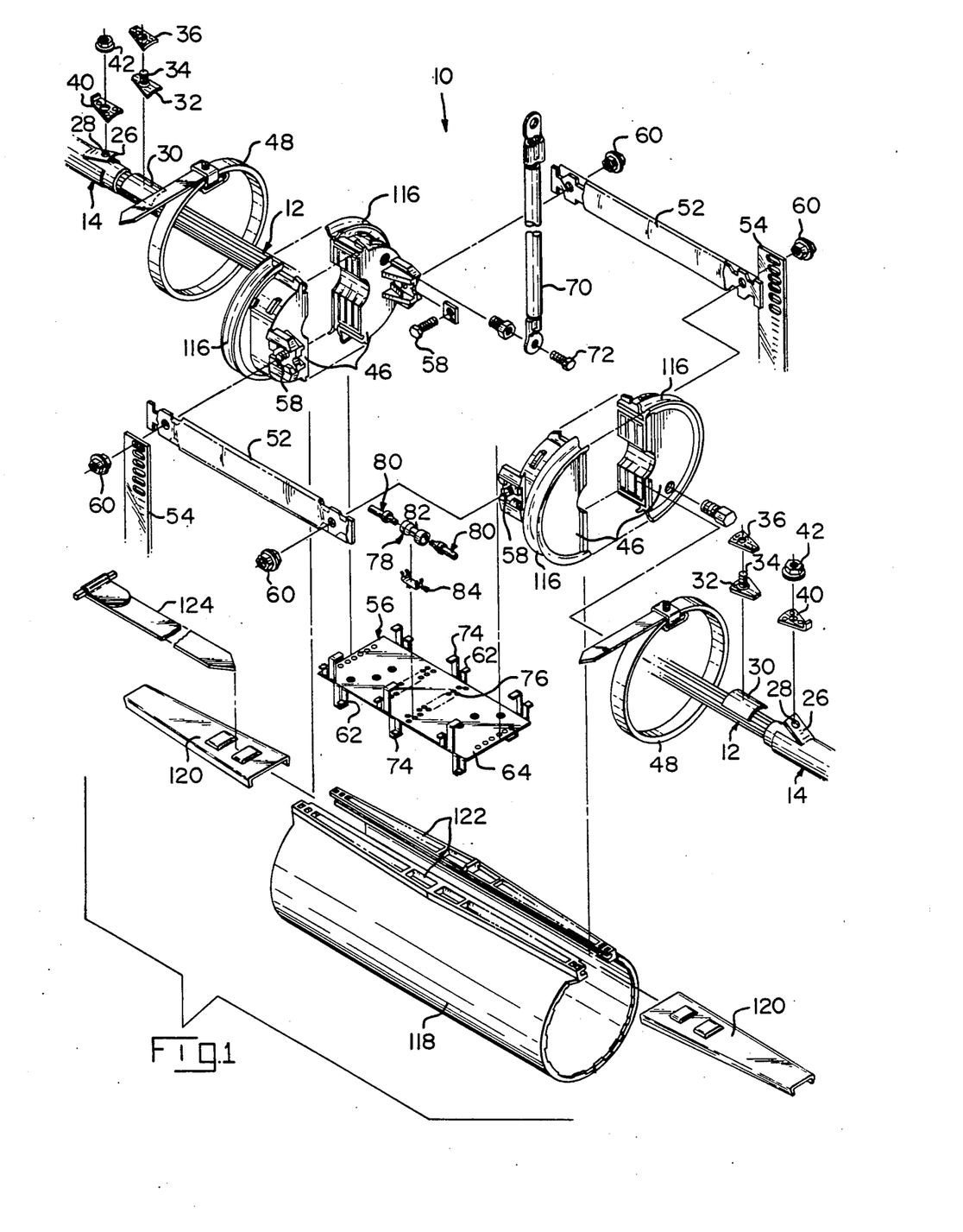
FIG. 1 is an exploded and perspective view of the components of the fiber optic connection system.
Figures 2, 3:
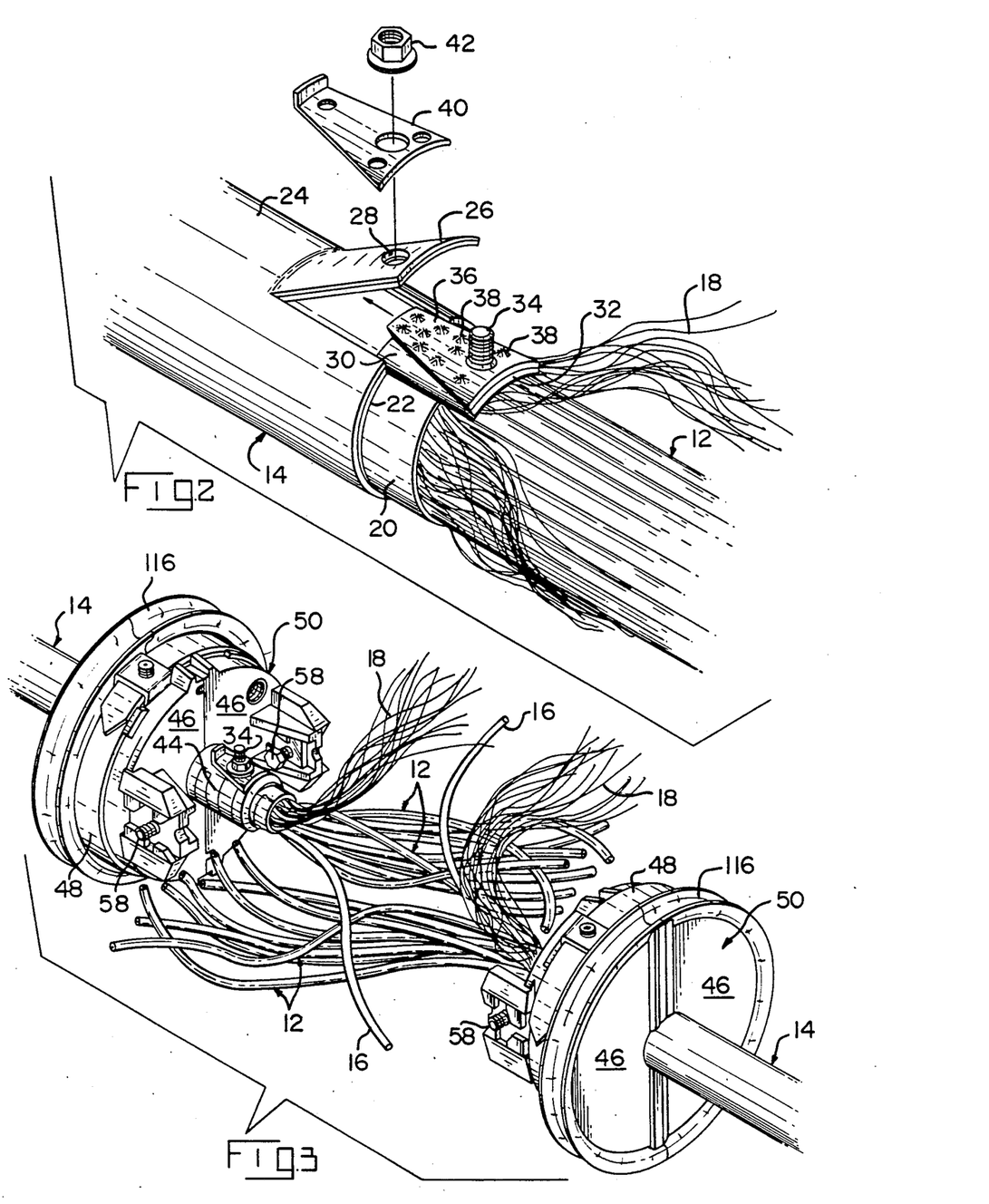
FIG. 2 is an exploded and perspective view of the cable anchor and ground connection.
FIG. 3 through 8 illustrate the various steps in completing the fiber optic connection system.

The end of cables 14 are prepared by exposing transmission members 12, strength members 16, 18, and a section of sheath 20. A rectangular flap section 26 of layer 22 and jacket 24 is cut from the remainder of metallic layer 22 and jacket 24 and is hingeably connected thereto as shown in FIG. 2. A dielectric support member 30 is positioned on sheath 20 along the area from which rectangular section 26 has been cut and its edges are disposed between sheath 20 and metallic layer 22 as shown in FIG. 2. A bottom anchor plate 32 is positioned on support member 30 and has a bolt 34 extending outwardly therefrom on which is positioned electrical contact member 36. A series of barbs 38 are formed in contact member 36 and they make electrical connection with the metallic layer of flap section 26. Bolt 34 extends through hole 28 when flap section 26 is moved into engagement with contact member 36. A top anchor plate 40 is on bolt 34 in engagement with flap section 26 and nut 42 is threadably positioned on bolt 34 and tightened thereby, an anchor and ground connection to the end of cable 14.

Figures 4, 5:
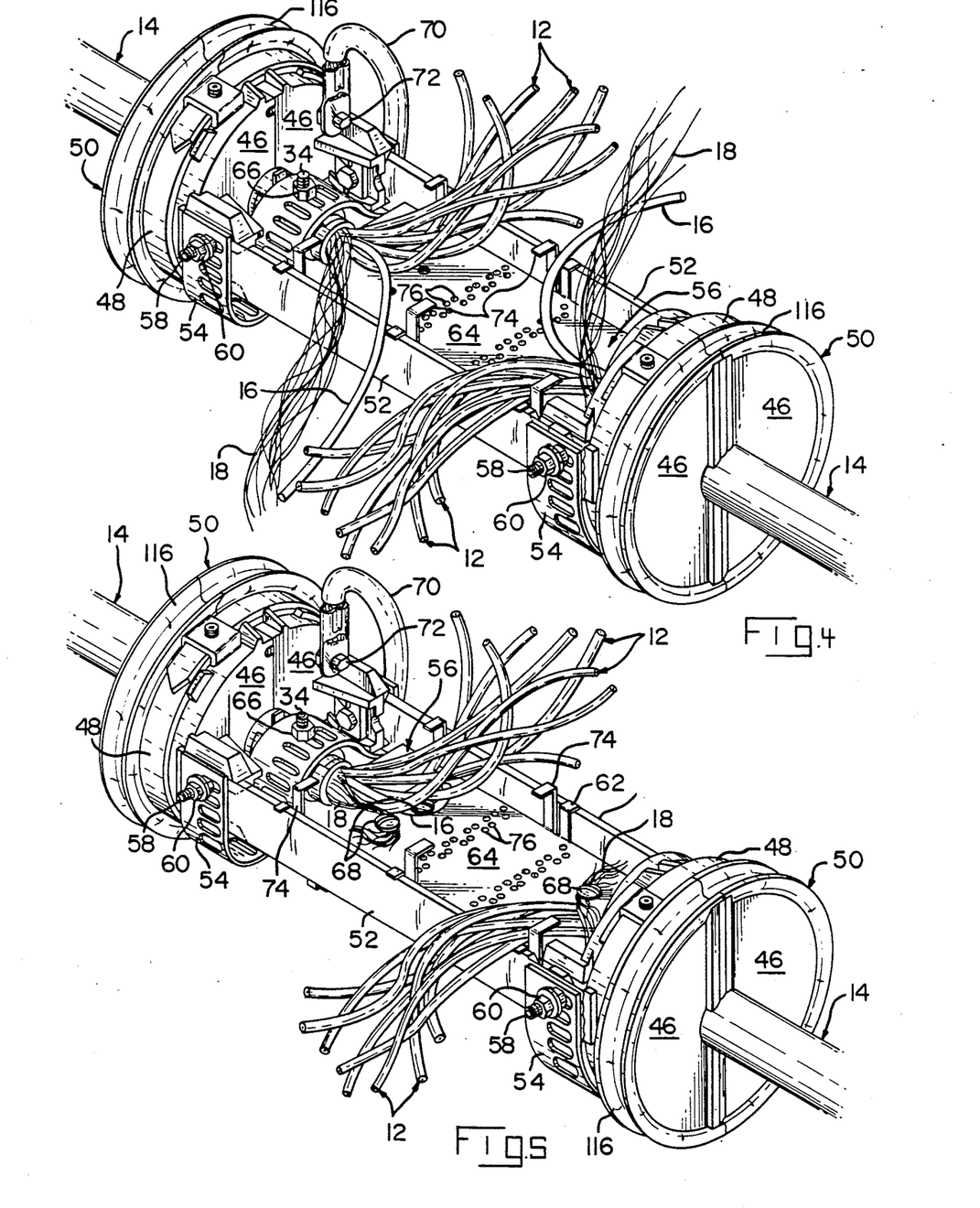
Figures 6, 7:
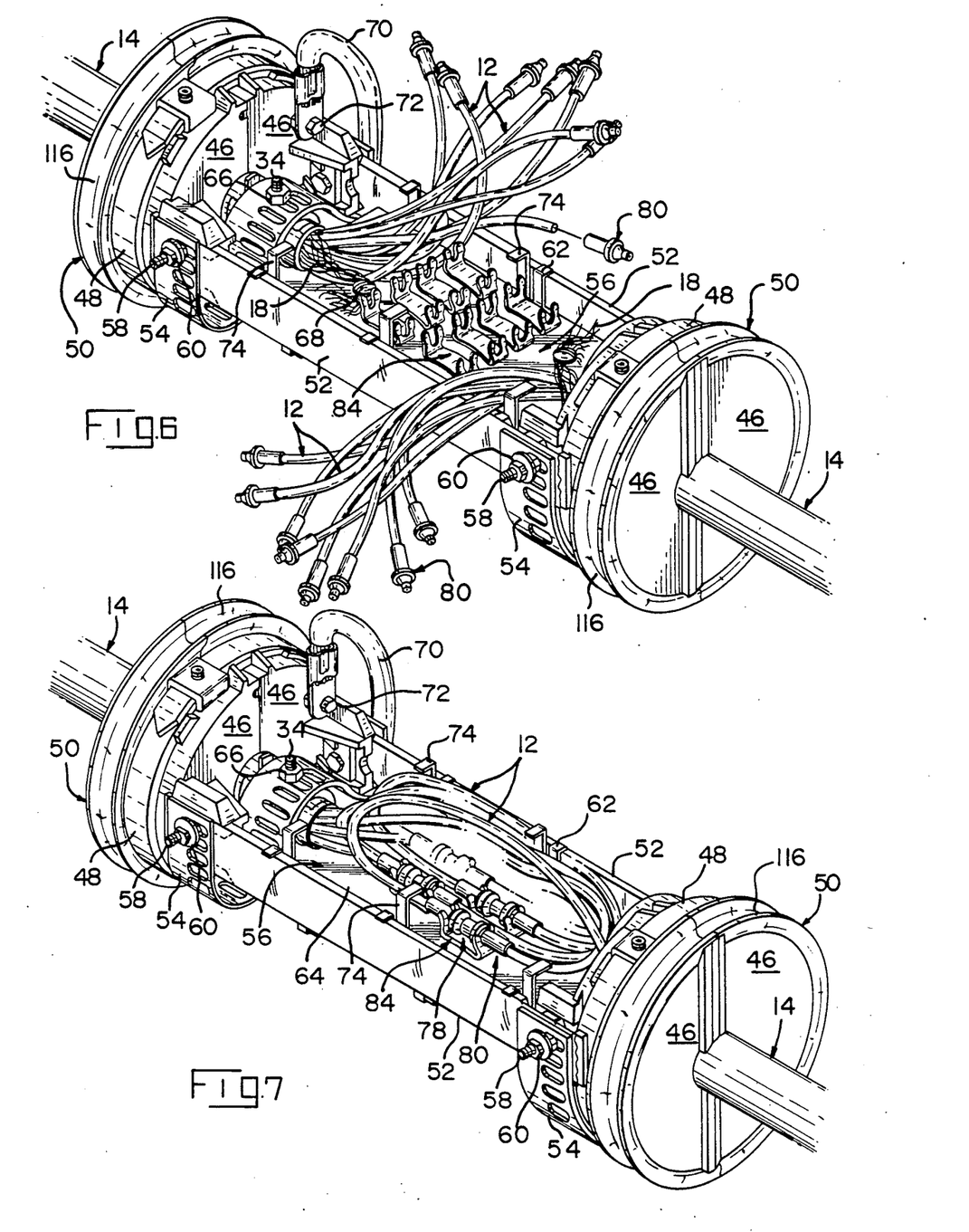

Prior to top anchor plate 40 being secured in positioned, sealing tape 44 as shown in FIG. 3 is wrapped around the end of the cable along jacket 24 whereafter anchor plate 40 is secured in position by nut 42. Members 46 are positioned onto the sealing tape 44 on the ends of cables 14 via straps 48 thereby forming end caps 50. Insulation-covered bars 52 and grounding bands 54 are secured onto bolts 58 and end caps 50 via nut 60 with organizer 56 disposed between bars 52 and mounted thereon by legs 62 extending outwardly from plate 64. Nuts 66 are threadably mounted on bolts 34 to secure grounding bands 54 in connection with the anchor and ground connection. Screws 68 secure center wire strength members 16 and strength members 18 of cables 14 to plate 64 of organizer 56 as illustrated in FIGS. 5 and 6. Ground wire 70, if used, is electrically connected between ground tap 72 in end caps 50 and one of bolts 58. Ground tap 72 has an external connection for connection to ground.

Figure 11:
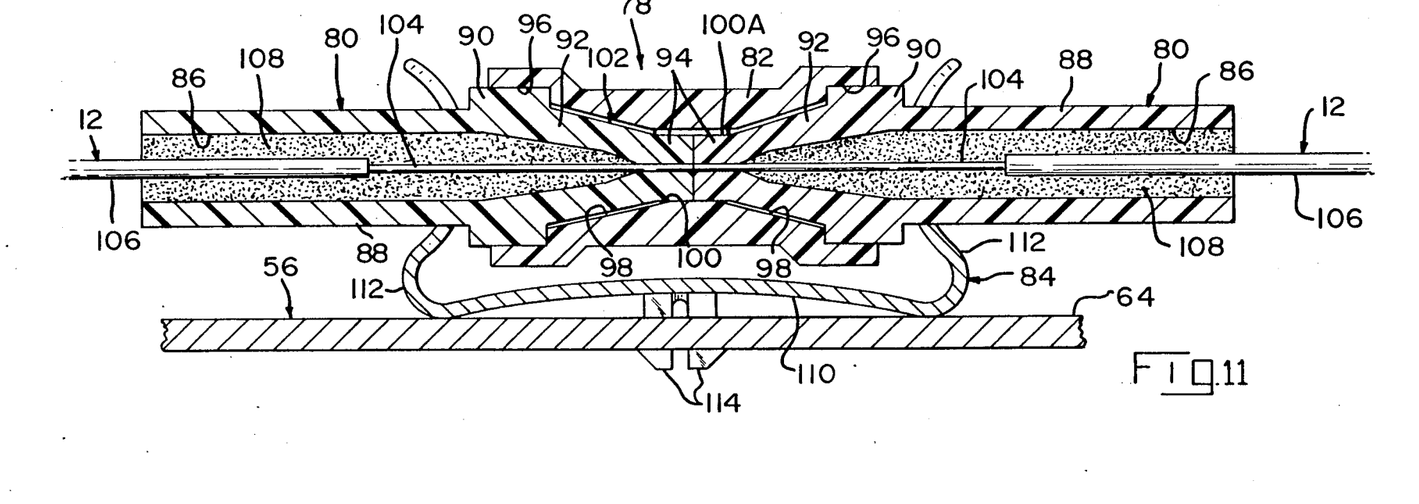

Organizer 56 also has inwardly-directed legs 74 spaced along each side thereof and rows of holes 76 extending therethrough. Fiber optic connectors 78 connect fiber optic transmission members 12 together. Each fiber optic connector 78 includes ferrule members 80 for terminating the ends of fiber optic transmission members 12, a tubular member 82 in which the profiled forward ends of ferrule members 80 are disposed, and a spring clip member 84 for maintaining ferrule members 80 in position in tubular member 82 and which are mounted on organizer 56. Ferrule members 80 are of the type disclosed in U.S. Pat. No. 3,999,837, the disclosure of which is completely incorporated herein by reference. Each ferrule member 80 is molded from a suitable plastic material having resilient characteristics and has a profiled bore 86 extending therethrough which has a rear cylindrical configuration, an intermediate conical section, and a forward cylindrical configuration, the forward cylindrical section being of smaller diameter than the rear cylindrical section. The exterior configuration of ferrule member 80 includes a rear cylindrical section 88, an annular shoulder section 90, a conical section 92, and a front cylindrical section 94. Section 94 defines a forward profiled section that tightly fits into a complementary section 100 of profiled bore 102 in tubular member 82. Sections 90 of ferrule members 80 fit within sections 96 of profiled bore 102 to limit movement of sections 94 into complementary section 100 while conical sections 92 of ferrule members 80 are preferably slightly spaced from sections 98. Tubular member 82 is molded from a rigid plastic material or it can be a machined metal member with profiled bore 102 having close tolerance dimensions so that when the profiled forward ends of ferrule members 80 are inserted into the complementary profiled sections of bore 102, the resilient nature of the material of ferrule members 80 will cause the forward ends of ferrule members 80 to be concentrically aligned within bore 102 as shown in FIG. 11 so that the ends of fiber optic transmission members 12 are axially aligned therein. A small slot 100A is in communication with section 100 which acts as a vent to prevent hydraulic action from taking place if index matching liquid, such as silicon oil or the like, is used in the connection of ferrule members 80 within profiled bore 102.

The ends of fiber optic transmission members 12 are stripped to expose fiber optic cores 104 which can be either glass or plastic material having cladding thereover, a buffer material (not shown), and an outer protective jacket 106. A potting material 108 such as epoxy resin or like material is disposed in bores 86 of ferrule members 80 and the stripped ends of fiber optic transmission members 12 are positioned therein until the forward ends of fiber optic cores 104 extend outwardly from front cylindrical sections 94. The potting material is allowed to cure after which the sections of fiber optic cores 104 extending outwardly from cylindrical sections 94 are removed at the front surfaces thereof. The surfaces of cylindrical sections 94 along with the ends of fiber optic cores 104 are polished thereby completing the termination of the ends of fiber optic transmission members 12 in ferrule members 80. The profiled forward ends of ferrule members 80 are then positioned within the complementary profiled sections of profiled bore 102 in tubular member 82 as shown in FIG. 11 with cylindrical sections 94 being concentric and the abutting ends of fiber optic cores 104 in axial alignment thereby minimizing light losses therebetween forming a fiber optic connector.

Ferrule members 80 can also be of the type disclosed in U.S. patent application Ser. No. 381,495 filed May 24, 1982, and now abandoned, the disclosure of which is incorporated herein by reference.

Figure 10:
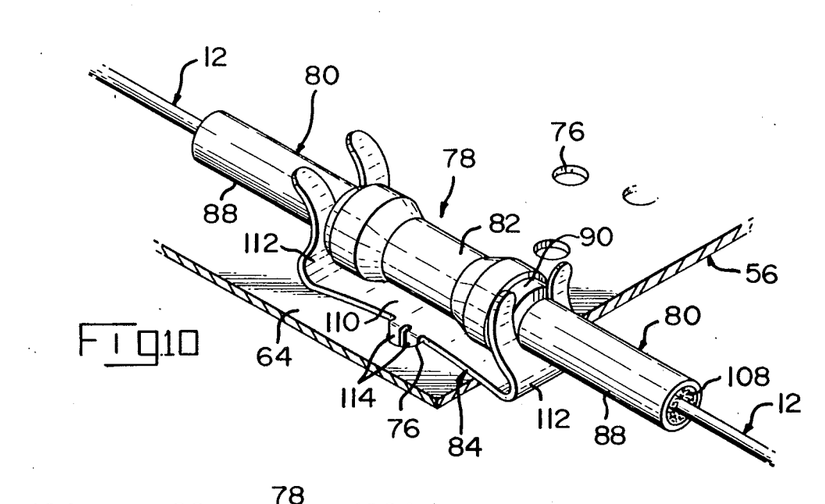

Spring clip member 84 is stamped and formed from a metal having suitable spring characteristics such as, for example, spring steel, and it includes an arcuate-shaped base member 110 with ferrule-engaging means extending substantially normally therefrom spaced from each other, the ends of which are formed into curved forks 112. A connector 78 is positioned in spring clip member 84 with cylindrical sections 88 of ferrule members 80 being disposed in curved fork ends 112 as shown in FIGS. 10 and 11, with the curved fork ends 112 engaging against shoulder sections 90 of ferrule members 80 thereby applying axial forces onto ferrule members 80 to maintain cylindrical sections 94 in concentric alignment within cylindrical section 100 of profiled bore 102 in tubular member 82 thereby maintaining fiber optic cores 104 in axial alignment due to the resilient characteristics of ferrule members 80. The arcuate configuration of base member 110 contributes to the spring characteristics of forked ends 112.

A pair of barbed legs 114 extend outwardly from base member 110 on each side thereof at a central location thereof for engagement with holes 76 in plate 64 of organizer 56 to position fiber optic connectors 78 in organizer 56 and fiber optic transmission members 12 are neatly arranged within organizer 56 with inwardly-directed legs 74 maintaining transmission members 12 in position therein as shown in FIG. 7. Spring clip members 84 can also be used to maintain fiber optic connectors 78 in a connected condition in a free-hanging manner if desired, legs 114 being absent.

Figures 8, 9:
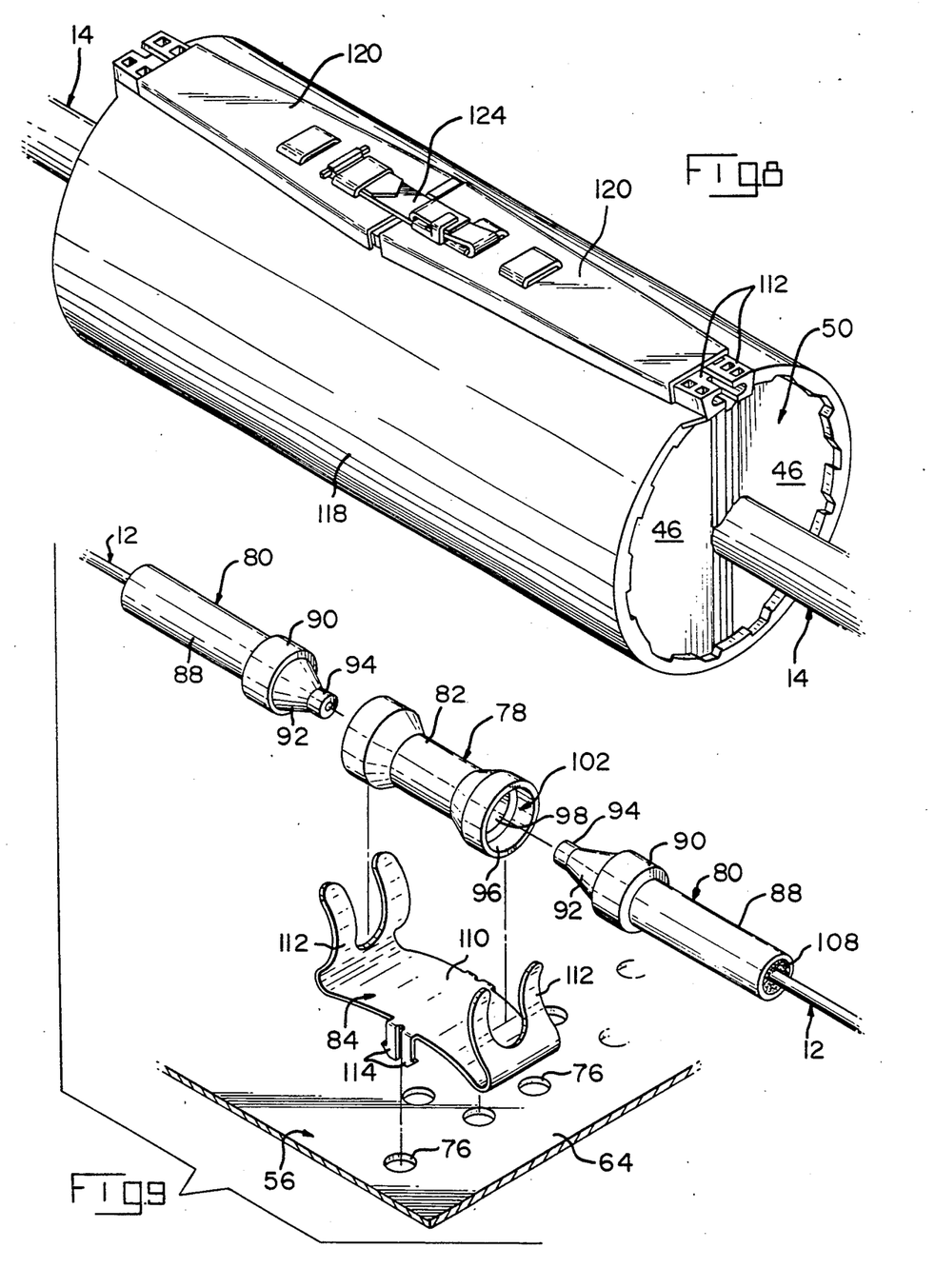
FIGS. 9 through 11 illustrate details of the fiber optic connector.

Sealing material is placed in recesses 116 of end caps 50 after which split sleeve 118 of plastic material is placed onto end caps 50 covering the terminated fiber optic transmission members, clamping bars 120 are moved along sealingly matable closing edges 122 and secured in position by clamping band 124 as illustrated in FIG. 8.

From the foregoing, a fiber optic connection has been described that is sealed from the environment, can withstand wide temperature variations, can be used in underground installations, enables the fiber optic connectors to be disconnected, enables the fiber optic connectors to be adjusted to provide low loss connections, and enables the terminations to be tested.

I claim:

1. A fiber optic connection system for connecting fiber optic transmission members of fiber optic cables, comprising:

end cap means securable onto the fiber optic cables adjacent stripped ends thereof;

bar means connected to said end cap means spacing said end cap means relative to one another;

organizer means mounted on said bar means;

ferrule means secured onto ends of the fiber optic transmission members, said ferrule means having profiled forward end means, annular shoulder means rearwardly thereof, and rear cylindrical section means extending rearwardly of said shoulder means;

tubular means having profiled bore means extending therethrough defining complementary areas in which said profiled forward end means of said ferrule means of pairs of fiber optic transmission members being connected are received thereby concentrically and axially aligning the forward ends of said profiled forward end means and the fiber optic cores of the fiber optic transmission members therein, forming fiber optic connectors;

spring clip means mountable on said organizer means, each said spring clip means having spaced ferrule-engaging means extending substantially normally from a base member capable of holdably receiving a respective said fiber optic connector therein with a said tubular means therebetween with a said tubular means therebetween and engaging respective said annular shoulder means of said ferrule means rearwardly thereof under axial spring bias, thereby cooperatingly urging together said ferrule means to maintain said ferrule means in said tubular means and said profiled front end means of said paired ferrule means in concentric alignment within said tubular means; and sleeve means covering said organizer means and sealingly secured onto said end cap means.

2. A fiber optic connection system as set forth in claim 1 wherein anchor and ground connection means connected to the ends of the fiber optic cables and said bar means.

3. A fiber optic connection system as set forth in claim 1 wherein said organizer means includes inwardly-directed leg means to maintain the fiber optic transmission members in an orderly arrangement therealong.

4. A fiber optic connection system according to claim 1 wherein said spring clip means include pairs of spring legs having barb means for disposition in holes in said organizer means to maintain said spring clip means in position on said organizer means.

5. A fiber optic connection system as set forth in claim 1 wherein said ferrule-engaging means is forked.

6. A fiber optic connection system as set forth in claim 1 wherein said base member is arcuate and extending centrally thereof toward said fiber optic connector.

7. A fiber optic connector system as set forth in claim 1 wherein said spring clip means is an integral stamped and formed member including said base member and said ferrule-engaging means.

8. A method of connecting fiber optic cores of fiber optic transmission members of fiber optic cables, comprising the steps of:
stripping ends of the fiber optic cables exposing the fiber optic transmission members;
sealingly securing end cap means onto the fiber optic cables adjacent the stripped ends;
connecting bars between said end cap means thereby spacing said end cap means from one another;
securing ferrule members onto ends of the fiber optic transmission members with the ends of the fiber optic cores being coplanar with forward ends of the ferrule members;
positioning profiled ends of said ferrule members into profiled sections of profiled bores in tubular members thereby forming fiber optic connections and causing the profiled ends to be concentric in the tubular bores and the fiber optic cores to be axially aligned;
placing the fiber optic connections each in a respective spring clip member such that a said tubular member thereof is disposed between ferrule-engaging sections of said spring clip member and a pair of said ferrule members are urged together by said ferrule-engaging sections thereby maintaining the ferrule members within the associated tubular member and concentrically aligning said ferrule members within said associated tubular member; and
sealingly securing a sleeve onto said end caps and covering the fiber optic connections.

9. A method as set forth in claim 8 comprising the further step of mounting an organizer along said bars after said bars have been connected to said end caps and mounting said spring clip members onto said organizer.

10. A method as set forth in claim 9 comprising the further step of arranging the fiber optic transmission members along said organizer.

11. A method as set forth in claim 8 comprising the further step of connecting an anchor and ground connection assembly to the fiber optic cables and the bars where said bars are connected to said end caps after said end caps have been secured onto the fiber optic cables.

12. A fiber optic connector for connecting fiber optic cores of fiber optic transmission members together, comprising:
ferrule means of resilient material each of which has a profiled bore extending therethrough in which the fiber optic transmission members are secured by potting material with ends of the fiber optic cores being coplanar with front ends of said ferrule means;
forward ends of said ferrule means having profiled configurations including cylindrical sections and conical sections;
tubular means having profiled bore means including a central cylindrical section and outer conical sections complementary with respect to the profiled forward end configurations of said ferrule means, said profiled forward ends of said ferrule means matable with the complementary sections of said profiled bore means of said tubular means thereby causing the cylindrical sections of said forward ends of said ferrule means in the central cylindrical section of said profiled bore means to be concentric and the fiber optic cores to be axially aligned; and
spring clip means having spaced ferrule-engaging means extending substantially normally from a base member capable of holdably receiving rear cylindrical section means of said ferrule means disposed in said tubular means, with said ferrule-engaging means engaging shoulder means of said ferrule means thereby axially urging said profiled forward ends into the complementary profiled sections of said profiled bore means in concentric alignment therewithin.

13. A fiber optic connector as set forth in claim 12 wherein said spring clip means has an arcuate-shaped base member.

14. A fiber optic connector as set forth in claim 13 wherein spring leg means extend outwardly from said base member.

15. A fiber optic connector as set forth in claim 12 wherein rear cylindrical sections of said profiled forward ends in engagement with complementary rear cylindrical sections of said profiled bore means define stop means limiting the movement of said profiled forward ends within said profiled bore means.

16. A fiber optic connector as set forth in claim 12 wherein said central cylindrical section of said profiled bore means includes a slot in communication therewith.

17. A fiber optic connector as set forth in claim 12 wherein said ferrule-engaging means is forked.

18. A fiber optic connector as set forth in claim 12 wherein said spring clip means is an integral stamped and formed member including said base member and said ferrule-engaging means.

19. A separable splice for optic fibers comprising:
(a) a U-shaped spring clip having a pair of resilient arms extending from opposite ends of a central spine, each arm terminating in a pair of fingers, the fingers of each arm having a gap between them, fingers of one arm being spaced apart from fingers of the other arm, and
(b) a pair of pin-shaped fiber optic termini with means to maintain them engaged in axial alignment, even in the absence of said spring clip, each terminus having a shoulder transverse to its axis, said shoulders being spaced apart farther than the fingers of said arms, each terminus being inserted at its shoulder into the space between fingers of one of said arms so as to keep the arms of said clip flexed apart and said termini pressed toward each other.

20. The optic fiber splice of claim 19 characterized further in that each said arm is bifurcated to form a two-pronged fork, said prongs having interfacing chamfered corners and arcuate cutouts to facilitate the insertion and insure the retention of said termini within said arms.

21. The optic fiber splice of claim 19 characterized further by a tube having a profiled bore therethrough installed to surround each said pair of termini along the majority of their length between said clip arms.

22. A U-shaped spring clip for retaining a pin-shaped axially aligned terminus pair, said clip comprising:

(a) a spine, and
(b) a plurality of bifurcated arms extending from opposite sides of said spine, with one arm on a given side being in alignment with a corresponding arm on the opposite side to form a pair of terminus-retaining arms, each arm having means for removably retaining a terminus therein.

23. The spring clip of claim 22 characterized further in that each said arm includes a C-shaped region resiliently joining said arm to said spine.

24. The spring clip of claim 23 characterized further in that each said bifurcated arm includes a pair of prongs with rounded ends for guiding one of said termini.

* * * * *

UNITED STATES PATENT AND TRADEMARK OFFICE
CERTIFICATE OF CORRECTION

PATENT NO. : 5,048,916

DATED : September 17, 1991

INVENTOR(S) : BERNARD G. CARON

It is certified that error appears in the above-identified patent and that said Letters Patent is hereby corrected as shown below:

Claim 1, column 4, lines 59 - 60 - delete "with a said tubular means therebetween".

Claim 2, line 3 - insert --are-- before the word "connected".

Claim 4, line 1 - delete the words "according to" and insert the words --as set forth in--.

Claim 6, line 3 - after the word "toward" insert the words --a respective--

Claim 7, line 1 - delete the word "connector" and insert the word --connection--.

Claim 8, line 13 - delete the word "the" and insert the word --said--.

Claim 8, line 17 - delete the word "the", both occurrences, and insert the word --said--.

Claim 8, line 18 - delete the word "tubular bores" and insert the words --profiled bores of said tubular members--.

Claim 8, line 25 - delete the word "the" and insert the word --said--.

Claim 11, line 3 - delete the word "the" (2nd Occurrence) and insert the word --said--.

Claim 12, line 9 - after the word "means" insert the words --, said ferrule means including rearwardly facing shoulder means proximate rearward ends thereof--.

Claim 12, line 29 - after the word "engaging" insert the word --said--.

UNITED STATES PATENT AND TRADEMARK OFFICE
CERTIFICATE OF CORRECTION

PATENT NO. : 5,048,916

DATED : September 17, 1991

INVENTOR(S) : Bernard G. Caron

It is certified that error appears in the above-identified patent and that said Letters Patent is hereby corrected as shown below:

Claim 19, line 4 - insert the word --said-- after the word "each".

Claim 19, line 4 - delete the word "the" and insert the word --said--.

Claim 19, line 5 - after the word "each" insert the word --said--.

Claim 19, line 5 - after the word "them," insert the word --said--.

Claim 19, line 6 - after the word "one" insert the word --said--.

Claim 19, line 6 - after the word "from" insert the word --said--.

Claim 19, line 7 - after the word "other" insert the word --said--.

Claim 19, line 10 - after the word "each" insert the word --said--.

Claim 19, line 12 - delete the word "the" and insert the word --said--.

Claim 19, line 13 - after the word "each" insert the word --said--.

Claim 19, line 13 - delete the word "its" and insert the word --said--.

Claim 19, line 14 - insert the word --thereof-- before the word "into".

Claim 19, line 14 - delete the words "the space" and insert the words --said gap--.

Claim 19, line 14 - after the word "between" insert the word --said--.

Claim 19, column 7, line 1 - delete the word "the" and insert the word --said--.

UNITED STATES PATENT AND TRADEMARK OFFICE
CERTIFICATE OF CORRECTION

PATENT NO. : 5,048,916

DATED : September 17, 1991

INVENTOR(S) : Bernard G. Caron

It is certified that error appears in the above-identified patent and that said Letters Patent is hereby corrected as shown below:

Claim 22, column 8, line 3 - insert the word --said-- before the word "arm".

Claim 22, column 8, line 5 - insert the word --said-- before the word "arm".

Claim 22, column 8, line 6 - insert the word --said-- before the word "arm".

Claim 24, line 3 - after the word "guiding" insert the words --a respective--.

Claim 24, line 4 - before "." insert the words --during insertion into said gap of said bifurcated arm--.

Signed and Sealed this

Sixteenth Day of February, 1993

Attest:

STEPHEN G. KUNIN

*Attesting Officer*     *Acting Commissioner of Patents and Trademarks*